United States Patent
Kim et al.

(10) Patent No.: US 10,133,349 B2
(45) Date of Patent: *Nov. 20, 2018

(54) DISPLAY APPARATUS AND METHOD OF CONTROLLING THE SAME

(71) Applicant: SAMSUNG ELECTRONICS CO., LTD., Suwon-si (KR)

(72) Inventors: Chang-han Kim, Suwon-si (KR); In-Ho Choi, Hwaseong-si (KR); Tae-hwa Hong, Seoul (KR); Hong-il Kim, Suwon-si (KR); Joo-young Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,705

(22) Filed: Oct. 6, 2017

(65) Prior Publication Data
US 2018/0032136 A1 Feb. 1, 2018

Related U.S. Application Data

(63) Continuation of application No. 14/598,921, filed on Jan. 16, 2015, now Pat. No. 9,804,670.

(30) Foreign Application Priority Data

Jan. 16, 2014 (KR) .................. 10-2014-0005683

(51) Int. Cl.
*G06F 3/01* (2006.01)
*H04N 5/33* (2006.01)
*H04N 5/225* (2006.01)

(52) U.S. Cl.
CPC ........... *G06F 3/013* (2013.01); *H04N 5/2256* (2013.01); *H04N 5/33* (2013.01)

(58) Field of Classification Search
USPC ........................................................ 345/156
See application file for complete search history.

(56) References Cited

U.S. PATENT DOCUMENTS

| | | | |
|---|---|---|---|
| 9,804,670 B2 * | 10/2017 | Kim | ................ G06F 3/013 |
| 2006/0039686 A1 | 2/2006 | Soh | |
| 2007/0296848 A1 | 12/2007 | Terashima | |
| 2008/0080747 A1 | 4/2008 | Takagi | |
| 2009/0304232 A1 | 12/2009 | Tsukizawa | |
| 2012/0075432 A1 | 3/2012 | Bilbrey | |
| 2012/0105486 A1 | 5/2012 | Lankford | |
| 2012/0182523 A1 | 7/2012 | Wyatt | |

(Continued)

FOREIGN PATENT DOCUMENTS

| | | |
|---|---|---|
| JP | 05-344954 A | 12/1993 |
| KR | 10-2012-0055404 A | 5/2012 |

*Primary Examiner* — Tony Davis
(74) *Attorney, Agent, or Firm* — Sughrue Mion, PLLC

(57) ABSTRACT

A display apparatus includes an infrared outputter configured to output infrared light toward a user, an image capturer configured to photograph the user to generate a captured image, and a controller configured to detect, from the captured image, a pupil and an iris of the user, and a glint area generated by the infrared light, and to determine, in response to the pupil, the iris, and the glint area being detected, a direction of the user's gaze based on a relation between a location of the pupil, and the glint area, and a size of the iris.

16 Claims, 12 Drawing Sheets

(56) References Cited

U.S. PATENT DOCUMENTS

| | | |
|---|---|---|
| 2012/0290401 A1 | 11/2012 | Neven |
| 2013/0050070 A1 | 2/2013 | Lewis |
| 2013/0176208 A1 | 7/2013 | Tanaka |
| 2013/0201359 A1 | 8/2013 | Wu |
| 2014/0341473 A1 | 11/2014 | Lee |
| 2014/0375541 A1 | 12/2014 | Nister |
| 2015/0010206 A1 | 1/2015 | Sakamaki |
| 2015/0160725 A1 | 6/2015 | Lee |
| 2015/0199008 A1* | 7/2015 | Kim ............... G06F 3/013 345/156 |
| 2015/0288923 A1 | 10/2015 | Kim |
| 2015/0339527 A1 | 11/2015 | Plummer |

* cited by examiner

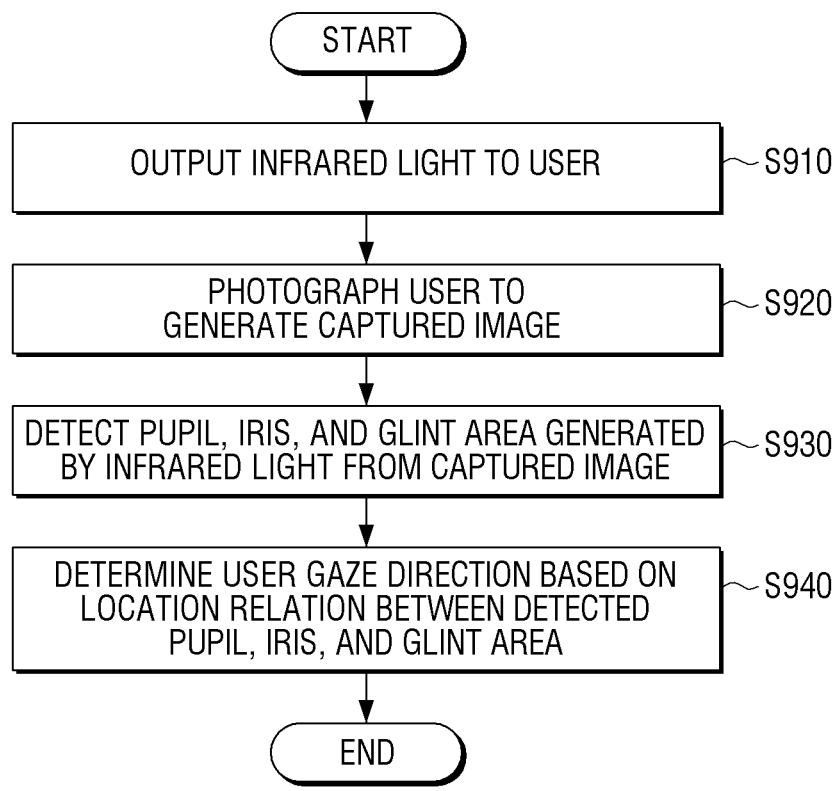

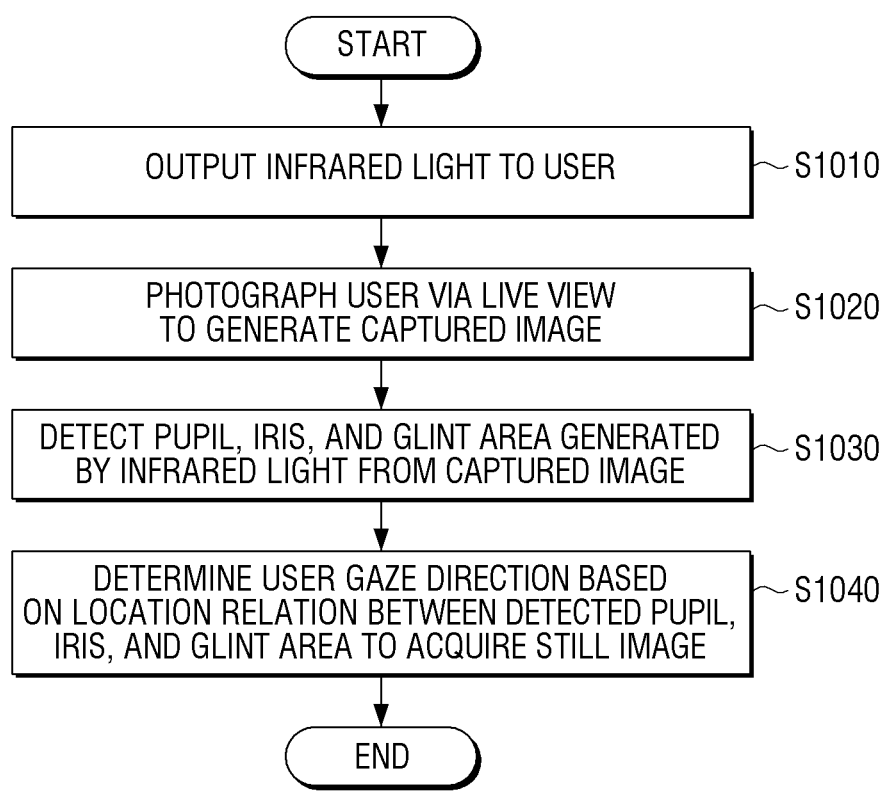

DISPLAY APPARATUS AND METHOD OF CONTROLLING THE SAME

CROSS-REFERENCE TO RELATED APPLICATIONS

This is a Continuation of U.S. application Ser. No. 14/598,921, filed Jan. 16, 2015, which claims priority from Korean Patent Application No. 10-2014-0005683, filed on Jan. 16, 2014, in the Korean Intellectual Property Office, the disclosure of which is incorporated herein by reference in its entirety.

BACKGROUND

1. Field

Apparatuses and methods consistent with exemplary embodiments relate to a display apparatus and a method of controlling the same, and more particularly, to a display apparatus and a method of controlling the same, for determining a user gaze direction via eye tracking.

2. Description of the Related Art

By virtue of the development of electronic technologies, various types of electronic products have been developed and have become widely popular. In particular, various display apparatuses such as televisions (TVs), cellular phones, personal computers (PCs), notebook PCs, personal digital assistances (PDAs), etc. have been widely used in most general homes.

As display apparatuses have become widely popular, user needs for more various functions have been increased. Thus, a significant amount of research has been conducted to satisfy user needs and thus products with new functions continue to be introduced.

Thus, functions performed by display apparatuses have been diversified. In particular, many methods of determining a direction of user gaze via user eye tracking to perform a corresponding function have been developed.

Conventional eye tracking methods use a method of calculating a gaze location by analyzing glint and pupil in order to measure a gaze direction.

However, according to this method, separate complex calculation is required and computational load is too high. In addition, this method is not necessary to detect whether a gaze direction is a front direction. When a user moves or a display apparatus is moved during eye tracking, eye tracking is not accurately achieved due to influence of the movement.

Accordingly, there is a need for a method of only determining whether a gaze direction is a front direction while reducing computational load and influence of the movement.

SUMMARY

Exemplary embodiments address the above disadvantages and other disadvantages not described above. Also, the exemplary embodiments are not required to overcome the disadvantages described above, and an exemplary embodiment may not overcome any of the problems described above.

One or more exemplary embodiments provide a display apparatus and a method of controlling the same, for determining whether a gaze direction is a front direction.

According to an aspect of an exemplary embodiment, there is provided a display apparatus including: an infrared outputter configured to output infrared light toward a user, an image capturer configured to photograph the user to generate a captured image, and a controller configured to detect, from the captured image, a pupil and an iris of the user, and a glint area generated by the infrared light, and determine, in response to the pupil, the iris, and the glint area being detected, a direction of the user's gaze based on a relation between a location of the pupil and the glint area, and a size of the iris.

The controller may be further configured to compare a distance between central points of the pupil and the glint area with respect to the size of the iris, determine that the direction of the user's gaze is a front direction in response to a result of the comparing being less than a predetermined threshold value, and determine that the direction of the user's gaze is not the front direction in response to the result of the comparing being equal to or greater than the predetermined threshold value.

In response to the iris not being detected, the controller may be further configured to compare a distance between central points of the pupil and the glint area and with respect to a distance between two detected eyes of the user, determine that the direction of the user's gaze is a front direction in response to a result of the comparing being less than a predetermined threshold value, and determine that the direction of the user's gaze is not the front direction in response to the result of the comparing being equal to or greater than the predetermined threshold value.

The display apparatus may further include a storage configured to store an image of an eye directed in a front direction, wherein the controller may be further configured to detect, from the captured image, an image of an eye area of the user and compare the detected image and the image stored in the storage to determine the direction of the user's gaze direction, in response to at least one of the pupil, the iris, and the glint area not being detected from the captured image.

The display apparatus may further include a storage configured to store an image of an eye directed in a front direction, wherein the controller may be further configured to detect, from the captured image, an image of the user's eye area, compare the detected image and the image stored in the storage to determine the direction of the user's gaze, and determine the direction of the user's gaze in response to the direction of the user's gaze determined based on a location relation between the pupil, the iris, and the glint area being the same as the direction of the user's gaze determined using the image stored in the storage.

The image capturer may be further configured to generate the captured image via a preview, and controller may be further configured to determine the direction of the user's gaze based on the captured image generated via the preview, and control the image capturer to acquire a still image based on the determined direction of the user's gaze.

The controller may be further configured to compare a distance between central points of the pupil and the glint area with respect to the size of the iris, and determine that the direction of the user's gaze is a front direction in response to a result of the comparing being less than a predetermined threshold value, and control the image capturer to acquire the still image in response to determining that the direction of the user's gaze is the front direction.

The controller may be further configured to, in response to the iris not being detected, compare the distance between the central points of the pupil and the glint area with respect to a distance between two detected eyes of the user, and determine that the direction of the user's gaze is the front direction in response to a result of the comparing being less than a predetermined threshold value, and control the image capturer to acquire the still image in response to determining that the direction of the user's gaze is the front direction.

According to an aspect of another exemplary embodiment, there is provided a method of controlling a display apparatus including: outputting infrared light toward a user, photographing the user to generate a captured image, detecting, from the captured image, a pupil and an iris of the user, and a glint area generated by the infrared light, and determining, in response to the pupil, the iris and the glint area being detected, a direction of the user's gaze based on a relation between a location of the pupil and the glint area, and a size of the iris.

The determining may include comparing a distance between central points of the pupil and the glint area with respect to the size of the iris, determining that the direction of the user's gaze is a front direction in response to a result of the comparing being less than a predetermined threshold value, and determining that the direction of the user's gaze is not the front direction in response to the result value being equal to or greater than the predetermined threshold value.

The determining may include, in response to the iris not being detected, comparing a distance between central points of the pupil and the glint area with respect to a distance between two detected eyes of the user, determining that the direction of the user's gaze is a front direction in response to a result of the comparing being less than a predetermined threshold value, and determining that the direction of the user's gaze is not the front direction in response to the result of the comparing being equal to or greater than the predetermined threshold value.

The determining may include detecting, from the captured image, an image of an eye area of the user and comparing the detected image and an eye image stored in a storage to determine the direction of the user's gaze, in response to at least one of the pupil, the iris, and the glint area not being detected from the captured image.

The determining may include detecting, from the captured image, an image of an eye area of the user and comparing the detected image and an eye image stored in a storage to determine the direction of the user's gaze, and determining the direction of the user's gaze in response to the direction of the user's gaze determined based on the relation between the location of the pupil and the glint area, and the size of the iris, being the same as the direction of the user's gaze determined using the eye image stored in the storage.

The method may further include generating the captured image via a preview, and determining the direction of the user's gaze based on the captured image generated via the preview to acquire a still image.

The acquisition of the still image may include comparing a distance between central points between the pupil and the glint area with respect to the size of the iris, and acquiring the still image in response to determining that the direction of the user's gaze is a front direction based on a result of the comparing being less than a predetermined threshold value.

The acquisition of the still image may include, in response to the iris not being detected, comparing the distance between the central points of the pupil and the glint area with respect to a distance between two detected eyes of the user, and acquiring the still image in response to determining that the user gaze direction is a front direction based on a result of the comparing being less than a predetermined threshold value.

According to an aspect of another exemplary embodiment, there is provided a gaze determining apparatus including: an infrared outputter configured to output infrared light toward a user; an image capturer configured to capture an image of the user; and a controller configured to analyze the captured image to determine a size of an iris of the user, and a location of a pupil of the user and a glint area generated by light reflected by an eye of the user from the output infrared light, and determine whether a direction of the user's gaze is a front direction, based on the determined location of the pupil and the glint area, and size of the iris.

The controller may be further configured to determine whether the direction of the user's gaze is the front direction according to the relationship: $K=d/R$, where d is a distance between central points of the pupil and the glint area, and R is the size of the iris.

In response to K being less than a predetermined value, the controller may be further configured to determine that the direction of the user's gaze is the front direction, and wherein in response to K being greater than or equal to the predetermined value, the controller may be further configured to determine that the direction of the user's gaze is not the front direction.

The controller may be further configured to perform a predetermined function in response to determining that the direction of the user's gaze is the front direction.

According to the various aforementioned exemplary embodiments, only whether a gaze direction is a front direction may be determined, such that the computational load may be reduced and influence of the movement may be reduced, and various functions may be performed according to the determination result.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING

The above and/or other aspects will become more apparent by describing certain exemplary embodiments with reference to the accompanying drawings, in which:

FIG. 9 is a flowchart for explanation of a method of controlling a display apparatus according to an exemplary embodiment; and FIG. 10 is a flowchart for explanation of a method of controlling a display apparatus according to another exemplary embodiment.

DETAILED DESCRIPTION OF THE EXEMPLARY EMBODIMENTS

Certain exemplary embodiments will now be described in greater detail with reference to the accompanying drawings.

Figure 1:
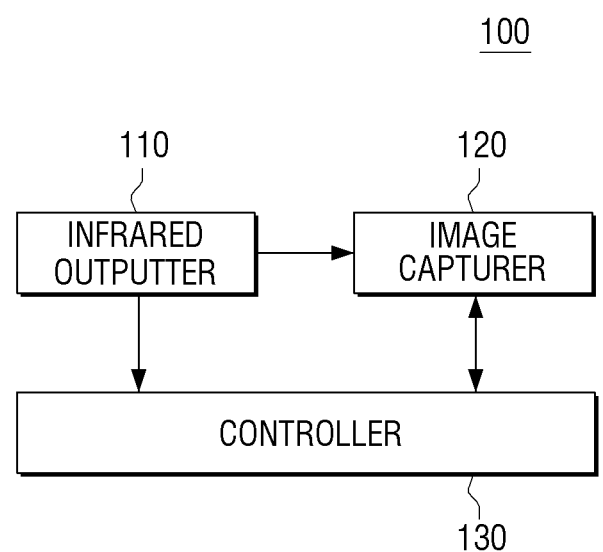
FIG. 1 is a block diagram illustrating a structure of a display apparatus according to an exemplary embodiment.

FIG. 1 is a block diagram illustrating a structure of a display apparatus 100 according to an exemplary embodiment.

Referring to FIG. 1, the display apparatus 100 includes an infrared outputter 110, an image capturer 120, and a controller 130. Here, the display apparatus 100 may be embodied as various types of electronic apparatuses such as a television (TV), an electronic bulletin board, an electronic table, a large format display (LFD), a smart phone, a desk top personal computer (PC), a notebook computer, etc.

The infrared outputter 110 may output infrared light in a direction toward a user. The infrared outputter 110 may then detect infrared information of an object (i.e., the user). A method of detecting infrared information is classified into a quantum type method and a thermal type method. The quantum type method detects light as quantum according to a photoconductive effect and a photovoltaic effect and uses indium antimonide (InSb), mercury-cadmium telluride (HgCdTe), etc. as a material. The quantum type method has excellent selectivity and response speed but needs to be performed at a low temperature in order to reduce thermal noise and have selectivity for wavelength.

The thermal type method converts absorbed infrared light into heat and uses physical quantum change of a material according to temperature change. Although the method uses various types of sensors according to a detection principle, a thermistor type of sensor using change in electric resistance and a pyroelectric sensor using change in surface resistance are used. These types of sensors may respond to all wavelengths in the same way, have non-selectivity, and may be used at an around room temperature.

The infrared outputter 110 may output infrared light towards the user. In more detail, the infrared outputter 110 may output infrared light in a direction toward the eyes of the user. That is, the infrared outputter 100 may be positioned around a camera lens such that the infrared outputter 110 may output infrared light in the direction toward the eyes of the user.

Thus far, the case in which the display apparatus 100 according to an exemplary embodiment outputs infrared light in the direction toward the user has been described. However, the display apparatus 100 may use a method of outputting surrounding light or light other than infrared light.

The image capturer 120 may photograph the user to generate a captured image. In general, the image capturer 120 may be embodied as a charge coupled device (CCD), which is a photosensor semiconductor that converts light into an electrical signal (e.g., as used in a digital camera).

A process of generating a captured image using the image capturer 120 will now be described in more detail. Light transferred into the display apparatus 100 through a lens and a diaphragm is converted into an electrical signal by the CCD according to intensity of light, and the converted electrical signal is converted into an image file through a converting device such as an analog-digital converter (ADC) for converting an analog signal into a digital signal (i.e., 0 or 1) and is stored in a memory. Here, in response to a driving signal, for driving the image capturer 120, being input, light comes in contact with the CCD through a lens and a diaphragm, and accordingly, intensity of the light transmitted from the lens is recorded in the CCD. In this case, light of a captured image is divided into different colors by RGB color filters attached to the CCD. In addition, the divided colors are converted into electrical signals by several hundreds of thousands of photosensitive devices included in the CCD. Here, the image capturer 120 generates a captured image using the electrical signal converted by the CCD. The image capturer 120 may be used in any electronic device such as a smart phone, a notebook computer, a television (TV), etc. as well as a camera.

The controller 130 may detect a pupil, an iris, and a glint area generated by infrared light from the generated captured image.

In general, in a visible light environment, brightness distributions of the pupil and iris are similar and thus a boundary therebetween is not clearly shown. However, in an infrared light and black and white camera environment, the brightness of the pupil and the brightness of the iris are very different, and thus, a boundary therebetween is clearly shown.

The controller 130 needs to detect boundary between an iris and a pupil and a boundary between an iris and white of eye from the captured image in order to detect the iris and the pupil from the captured image.

In detail, the boundary between the pupil and the iris may be detected by a circular edge detector. That is, the circular edge detector may add gray level values of pixels along a circumference of a circle formed according to a central point and a radius by changing the central point and the radius and then determine a position with a maximum difference in gray level values along with change in radius as the boundary between the pupil and the iris.

Since the boundary between the iris and the white of eye is thick and blurs, it is relatively difficult to find a boundary point. Thus, the central point of the iris may be scanned based on the central point of the pupil and may be scanned based on the fact in that an iris diameter is almost constant in a fixed-focus camera.

Needless to say, the pupil and the iris may be detected using various technologies of the related art, as well as the aforementioned method. The controller 130 of the display apparatus 100 according to an exemplary embodiment may be used to detect the pupil and the iris.

The controller 130 may detect the glint area generated by infrared light. Here, the glint area generated by infrared light refers to glint formed by infrared light, output from the infrared outputter 110 in the direction toward the user, and reflected by cornea of the user's eye.

The controller 130 may use a method of receiving glint area generated by infrared light using an infrared filter in order to detect the glint area generated by infrared light or may detect the glint area from a captured image containing the glint area.

Figure 2:
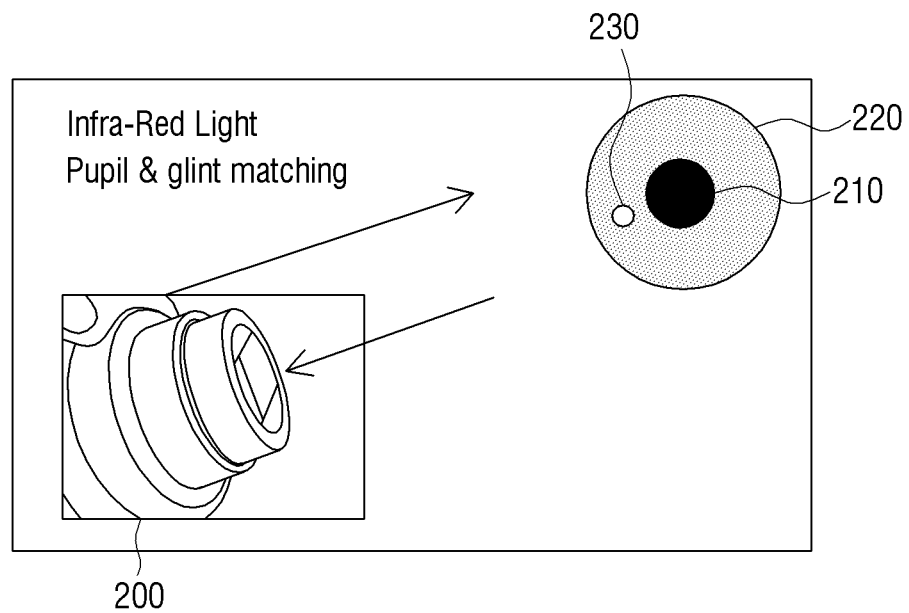
FIG. 2 is a diagram for explanation of a method of detecting a gaze direction using infrared light according to an exemplary embodiment.

FIG. 2 is a diagram for explanation of a method of detecting a gaze direction using infrared light according to an exemplary embodiment.

Referring to FIG. 2, a digital camera 200 may output infrared light in a direction toward a user to generate a glint area by the output infrared light, and photograph the user with the glint area indicated on the user to generate a captured image.

Here, the controller 130 may detect a pupil 210, an iris 220, and a glint area 230 generated by infrared light from the captured image.

In the aforementioned example, the controller 130 detects the pupil 210, the iris 220, and the glint area 230 generated by infrared light from the captured image that is generated by photographing the user using the image capturer 120. Alternatively, the controller 130 may control the infrared outputter 110 and the image capturer 120 to detect the pupil 210, the iris 220, and the glint area 230 generated by infrared light when the image capturer 120 performs photographing.

That is, the controller 130 may detect the pupil 210, the iris 220, and the glint area 230 generated by infrared light, in real time without generation of a photograph of the user.

The term 'captured image' used throughout this specification includes any image formed by all light beams transmitted through the image capturer 120 as well as a still image that is simply acquired by photograph.

Thus, a real time image for detection of the pupil 210, the iris 220, and the glint area 230 generated by infrared light by the controller 130 may also be included in the images formed by all light beams transmitted through the image capturer 120. For example, an image captured in the form of a preview may also be included in the captured image according to an exemplary embodiment.

Figure 3:
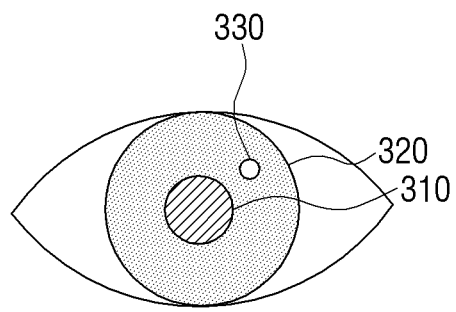
FIG. 3 is a diagram for detailed explanation of a method of determining a user gaze direction in detail according to an exemplary embodiment.

FIG. 3 is a diagram for detailed explanation of a method of determining a user gaze direction (i.e., a direction of the user's gaze) in further detail according to an exemplary embodiment.

Referring to FIG. 3, a pupil 310, an iris 320, and a glint area 330 are illustrated, and the controller 130 may determine a user gaze direction based on a location relation between the detected pupil 310, iris 320, and glint area 330. In detail, the location relation refers to a relation between the size of the iris 320 and a distance between central points of the pupil 310 and the glint area 330.

In particular, the controller 130 may compare the size of the iris 320 and the distance between the central points of the pupil 310 and the glint area 330, determine that the user gaze direction is in a front direction when a result value is less than a predetermined threshold value, and determine that the user gaze direction is not a front direction when the result value is equal to or greater than the threshold value.

The comparison between the size of the iris 320 and the distance between the central points of the pupil 310 and the glint area 330 may be calculated according to Equation 1 below.

$$K = \frac{d}{R} \quad (1)$$

Here, d is the distance between the central points of the pupil 310 and the glint area 330 and R is the size of the iris 320. Here, a radius or diameter of the iris 320 may be used instead of the size of the iris 320.

Thus, when a result value K, obtained by dividing the distance between the central points of the pupil 310 and the glint area 330 by the radius or diameter of the iris 320, is less than a predetermine threshold value, the controller 130 may determine that the user gaze direction is a front direction, and when the result value K is equal to or greater than the predetermined threshold value, the controller 130 may determine that the user gaze direction is not the front direction.

Since the determination is achieved according to the result value K obtained by comparing the size of the iris 320 and the distance between the central points of the pupil 310 and the glint area 330, even if a distance between a user and the display apparatus 100 is changed, the comparison result value K is ratio information between the distance between the central points of the pupil 310 and the glint area 330 and the radius or diameter of the iris 320, and thus, the comparison result value K may remain constant. Accordingly, the controller 130 of the display apparatus 100 according to an exemplary embodiment may accurately determine the user gaze direction even if user movement is changed or the distance between the user and the display apparatus 100 is changed due to movement, vibration, etc. of the display apparatus 100. That is, influence of a variable due to movement may be reduced, thereby increasing robustness of the determination with respect to movement.

Figure 4A:
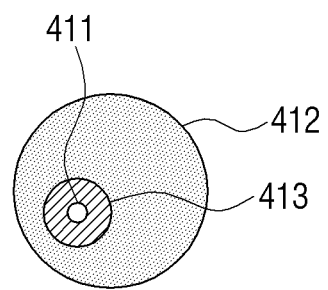
FIGS. 4A to 4C are diagrams for explanation of a method of determining a gaze direction based on a location relation between a pupil, an iris, and a glint area in detail, according to an exemplary embodiment.
Figure 4B:
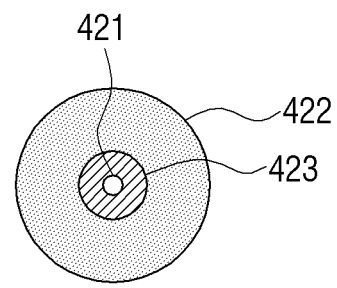
Figure 4C:
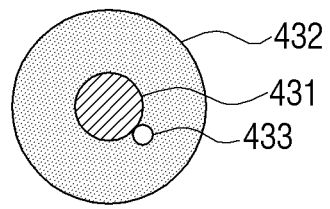

FIGS. 4A to 4C are diagrams for explanation of a method of determining a gaze direction based on a location relation between a pupil, an iris, and a glint area in further detail, according to an exemplary embodiment.

Referring to FIG. 4A, a central point of a pupil 413 and a central point of a glint area 411 are matched. Thus, according to Equation 1 above, the distance d between the central point of the pupil 413 and the central point of the glint area 411 is 0 and a radius or diameter of an iris 412 is a constant, and thus, the comparison result value K is 0. Thus, the result K is inevitably less than the predetermined threshold value, the controller 130 may determine that the user gaze direction illustrated in FIG. 4A is a front direction.

Referring to FIG. 4B, a central point of a pupil 423 and a central point of a glint area 421 are matched. Thus, according to Equation 1 above, the distance d between the central point of the pupil 423 and the central point of the glint area 421 is 0, like in FIG. 4A, and a radius or diameter of an iris 422 is a constant, and thus, the comparison result value K is 0. Thus, the result K is inevitably less than the predetermined threshold value, the controller 130 may determine that the user gaze direction illustrated in FIG. 4B is a front direction.

Referring to FIG. 4C, a central point of a pupil 431 and a central point of a glint area 433 are not matched, and thus, the distance d between the central point of the pupil 431 and the central point of the glint area 433 is a constant 'a'. In addition, a radius or diameter of an iris 432 is a constant, and thus, the comparison result value K is inevitably greater than 0 and less than 1.

Assuming that the predetermined threshold value is set to be very small (i.e., approximately 0), the controller 130 may consider that the result value K of FIG. 4C is greater than the predetermined threshold value and determine that the user gaze direction illustrated in FIG. 4C is not a front direction.

That is, when the predetermined threshold value is set to be approximately 0, a range in which the controller 130 determines a user gaze direction is a front direction is too narrow, and when the predetermined threshold value is set to be relatively slightly greater than 0, even if a central point of the pupil 431 and a central point of the glint area 433 are not completely matched, if a mismatched range is within a predetermined range, the controller 130 determines that the user gaze direction is a front direction, and thus, a range in which the controller 130 determines that the user gaze direction is a front direction is relatively wide.

Accordingly, the user may set the predetermined threshold value to adjust accuracy of determining whether the gaze direction is a front direction.

In a description with respect to FIG. 3, the radius or diameter of the iris 320 is used instead of the size of the iris 320, which is used to determine a user gaze direction only when the iris 320 is detected. Accordingly, with reference to FIG. 5, a method of determining a user gaze direction when the iris 320 is not detected will be described.

Figure 5:
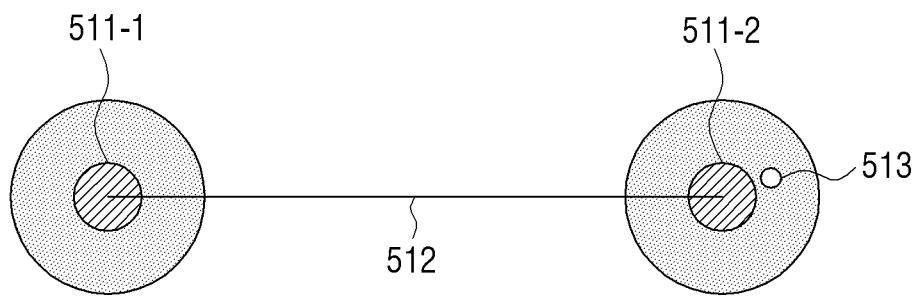
FIG. 5 is a diagram for explanation of a method of determining a gaze direction using a distance between two eyes according to an exemplary embodiment.

FIG. 5 is a diagram for explanation of a method of determining a gaze direction using a distance between two eyes according to an exemplary embodiment.

FIG. 5 illustrates two eyes of a user. Referring to FIG. 5, when the iris 320 is not detected, the controller 130 compares a distance between central points of a pupil 511-2 and a glint area 513 and a distance 512 between the two eyes. In this case, when the comparison result value is less than a predetermined threshold value, the controller 130 may determine that the user gaze direction is a front direction, and when the comparison result value is equal to or greater than the predetermined threshold value, the controller 130 may determine that the user gaze direction is not a front direction.

Here, the distance 512 between the two eyes may be defined as a distance between central points of the two pupils 511-1 and 511-2.

That is, when the iris 320 is not detected, the size of the iris 320 may not be calculated, and thus, the controller 130 may calculate a comparison result value based on a distance between central points of the pupil 511-2 and the glint area 513 using the distance 512 between the two eyes instead of the size of the iris 320.

Here, the image capturer 120 may photograph the two eyes to generate a captured image, and the controller 130 may calculate the distance 512 between the two eyes from the captured image. The method of comparing the distance 512 between the two eyes and the distance between the central points of the pupil 511-2 and the glint area 513 to determine a gaze direction is less affected by a variable due to movement, and robustness with respect to movement is increased. In addition, the accuracy of determining whether a gaze direction is a front direction using a predetermined threshold value determined by the user may be adjusted.

Figure 6:
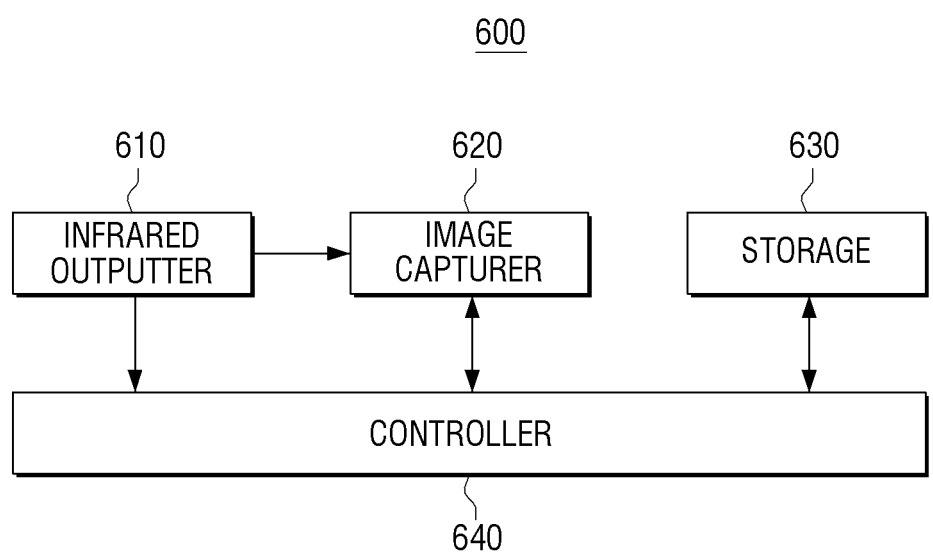
FIG. 6 is a block diagram illustrating a structure of a display apparatus for determining a gaze direction via pattern learning according to an exemplary embodiment.

FIG. 6 is a block diagram illustrating a structure of a display apparatus 600 for determining a gaze direction via pattern learning according to an exemplary embodiment.

Referring to FIG. 6, the display apparatus 600 includes an infrared outputter 610, an image capturer 620, a storage 630, and a controller 640. Here, the infrared outputter 610 and the image capturer 620 have been described already, and thus, will not be described in detail.

The storage 630 may store an image of an eye directed in a front direction. In detail, the storage 630 may store data about various images of eyes directed in a front direction. In addition, the storage 630 may also store data about various images of eyes that are not directed in a front direction.

When at least one of a pupil, an iris, and a glint area is not detected from a captured image and thus a user gaze direction may not determined based on a location relation between the pupil, the iris, and the glint area, the controller 640 may detect an image of a user eye area from the captured image and compare the detected image and an eye image stored in the storage 630 to determine a user gaze direction.

In detail, the controller 640 may determine the user gaze direction via pattern learning of an image of eye directed in a front direction and an image of an eye that is not directed in a front direction based on the detected image. Here, the controller 640 may compare data about various images of eyes directed in a front direction and data about the detected image to determine whether the images are matched. When the images are matched, the controller 640 may determine that a user gaze direction is a front direction.

The method of determining a user gaze direction via pattern learning may also be applied to the display apparatus 600 that does not include the infrared outputter 610.

Figure 7:
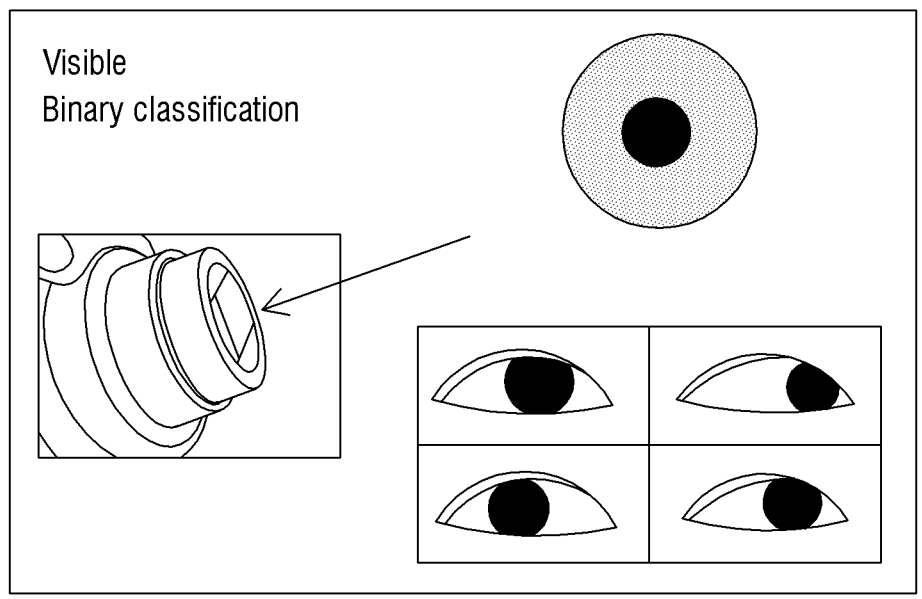
FIG. 7 is a diagram for explanation of a method of determining a user gaze direction via pattern learning according to an exemplary embodiment.

FIG. 7 is a diagram for explanation of a method of determining a user gaze direction via pattern learning according to an exemplary embodiment.

That is, as described above, the image capturer 620 may photograph a user to generate a captured image, and the controller 640 may detect an image of a user eye area from the captured image and then compare the detected image and an eye image stored in the storage 630 to determine a user gaze direction.

The controller 640 may also determine a user gaze direction using both of the two aforementioned methods. In detail, the controller 640 may detect an image of a user eye area from the captured image, compare the detected image and the eye image stored in the storage 630 to determine a user gaze direction. In addition, when a user gaze direction determined based on a location relation between a pupil, an iris, and a glint area is matched with a user gaze direction determined using the eye image stored in the storage 630, the controller 640 may determine a user gaze direction.

When the user gaze direction is determined using both the two methods, a user gaze direction may be more accurately determined.

Figure 8:
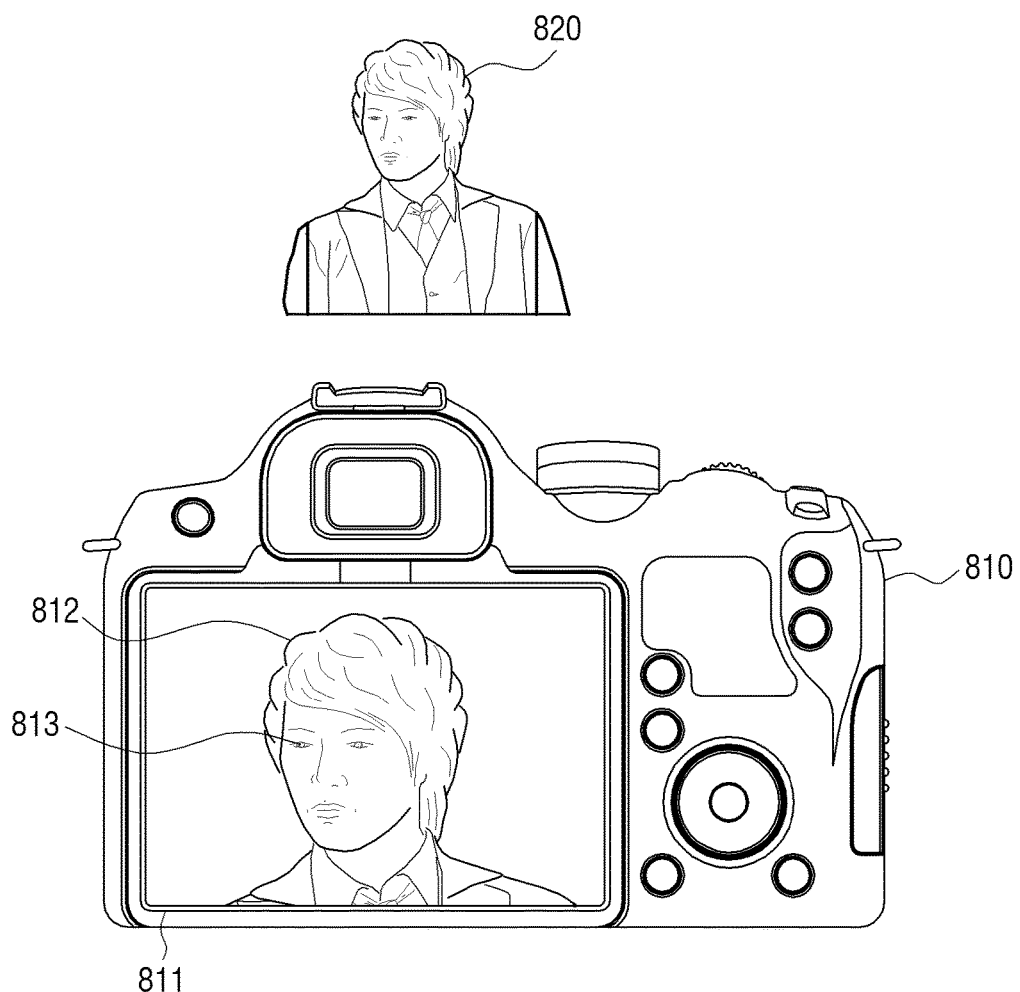
FIG. 8 is a diagram for explanation of a method of determining a gaze direction via a preview and acquiring a still image according to an exemplary embodiment.

FIG. 8 is a diagram for explanation of a method of determining a gaze direction via a preview and acquiring a still image according to an exemplary embodiment.

FIG. 8 illustrates a digital camera 810 as an example of the display apparatus 600 and an object 820. That is, the digital camera 810 may photograph the object 820 via a preview. The preview refers to an image in the form of a live view 811 before the image capturer 620 actually photographs the object 820 to generate a still image or a moving image.

Accordingly, the controller 640 may photograph the object 820 or a user via the preview and detect an eye area image 813 from a captured image 812 generated via the preview. In addition, like in FIG. 3, the controller 640 may detect the pupil 310, the iris 320, and the glint area 330 from the detected eye area image 813 and control the image capturer 620 to determine a user gaze direction based on a location relation between the detected pupil 310, iris 320, and glint area 330 to acquire a still image.

That is, the controller 640 may control the image capturer 120 to acquire the still image when the user gaze direction is a front direction, and the controller 640 may control the image capturer 620 not to acquire still image when the user gaze direction is not a front direction.

In detail, the controller 640 may compare the size of the iris 320 and the distance between the central points of the pupil 310 and the glint area 330, determine that the user gaze direction is a front direction when a result value is less than a predetermined threshold value, and control the image capturer 620 to acquire a still image.

In addition, when an iris is not detected, the controller 640 may compare the distance 512 between two eyes and the distance between the central points of the pupil 310 and the glint area 330, determine that the user gaze direction is a front direction when a result value is less than a predetermined threshold value, and control the image capturer 620 to acquire a still image.

Accordingly, a shutter may be automatically operated to perform photograph only when a user squarely views the display apparatus 600.

Needless to say, in this case, the user may adjust the predetermined threshold value to adjust the accuracy of determining whether a user gaze direction is a front direction. Thus, the controller 640 may acquire a still image according to the accuracy of determining the adjusted accuracy of determining whether the user gaze direction is a front direction.

The controller 640 of the display apparatus 600 according to an exemplary embodiment may determine whether the user gaze direction is a front direction, enable a display when the user gaze direction is a front direction and display an image, and disable the display when the user gaze direction is not in a front direction.

FIG. 9 is a flowchart for explanation of a method of controlling a display apparatus according to an exemplary embodiment.

In the method illustrated in FIG. 9, infrared light may be output in a direction toward a user (S910).

The user may be photographed to generate a captured image (S920).

A pupil, an iris, and a glint area generated by infrared light may be detected from the captured image (S930).

The user gaze direction may be determined based on a location relation between the detected pupil, iris, and glint area (S940).

Here, in the determination, a distance between central points of the pupil and the glint area and the size of the iris may be compared, a user gaze direction may be determined to be a front direction when a comparison result value is less than a predetermined threshold value, and the user gaze direction may not be determined to be a front direction when the comparison result value is equal to or greater than the predetermined threshold value.

In the determination, when the iris is not detected, the distance between the central points of the pupil and the glint area and a distance between two eyes may be compared, a user gaze direction may be determined to be a front direction when a comparison result value is less than a predetermined threshold value, and the user gaze direction may not be determined to be a front direction when the comparison result value is equal to or greater than the predetermined threshold value.

In the determination, when at least one of the pupil, the iris, and the glint area is not detected from the captured image, an image of a user eye area may be detected from the captured image, and the detected image and an eye image, directed in a front direction and stored in a storage, may be compared to determine the user gaze direction.

In addition, in the determination, a user eye area image may be detected from the captured image, the detected image and an eye image, directed in a front direction and stored in the storage, and may be compared to determine the user gaze direction. In this case, when a user gaze direction determined based on a location relation between a pupil, an iris, and a glint area is matched with a user gaze direction determined using the eye image stored in the storage, the user gaze direction may be determined.

FIG. 10 is a flowchart for explanation of a method of controlling a display apparatus according to another exemplary embodiment.

In the method illustrated in FIG. 10, infrared light may be output in a direction toward a user (S1010).

The user may be photographed via a live view to generate a captured image (S1020).

Then, a pupil, an iris, and a glint area generated by infrared light may be detected from the captured image (S1030).

The user gaze direction may be determined based on a location relation between the detected pupil, iris, and glint area to acquire a still image (S1040).

Here, in the acquisition of the still image, when a distance between central points of the pupil and the glint area and the size of the iris are compared, if a comparison result value is less than a predetermined threshold value, a user gaze direction may be determined to be a front direction and accordingly, a still image may be acquired when the user gaze direction is determined to be a front direction (e.g., when a user is viewing a camera).

In the acquisition of the still image, when the iris is not detected, the distance between the central points of the pupil and the glint area and a distance between two eyes are compared. In addition, when a comparison result value is less than the predetermined threshold result value, the user gaze direction may be determined to be a front direction and accordingly, a still image may be acquired when the user gaze direction is determined to be a front direction.

An exemplary embodiment provides a non-transitory computer readable medium having recorded thereon a program for sequentially executing processes of a controlling method.

For example, an exemplary embodiment provides a non-transitory computer readable medium having recorded thereon a program for executing detecting a pupil, an iris, and a glint area generated by infrared light from a captured image, and determining a user gaze direction based a location relation between the detected pupil, iris, and glint area.

In addition, for example, an exemplary embodiment provides a non-transitory computer readable medium having recorded thereon a program for executing photographing a user via a live view, detecting a pupil, an iris, and a glint area generated by infrared light from the image captured via the live view, and determining a user gaze direction based on a location relation between the detected pupil, iris, and glint area to acquire a still image (e.g., when the user is determined to be looking at a camera).

The non-transitory computer readable medium is a medium that semi-permanently stores data and from which data is readable by a device. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

Although the above block diagrams illustrating the transmitting apparatus and the receiving apparatus do not illustrate a bus, components of the transmitting apparatus and the receiving apparatus may communicate with each other via the bus. In addition, each apparatus may further include a processor such as a center processing unit (CPU), a microprocessor, and so on, for performing the aforementioned operations.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the inventive concept, as defined by the appended claims, and many alternatives, modifications, and variations will be apparent to those skilled in the art.

What is claimed is:

1. A display apparatus comprising:
a light outputter;
a camera; and a processor configured to:
control the light outputter to output a light toward a user,
identify, from an image of the user captured by the camera, a pupil of the user, an iris of the user and a glint area obtained by a reflection of the light, and
identify a direction of the user's gaze based on a distance between the pupil and the glint area, and a size of the iris.

2. The display apparatus as claimed in claim 1, wherein the processor is further configured to:
identify, from then captured image, an iris of the user,
compare a distance between central points of the pupil and the glint area with respect to a size of the iris, identify that the direction of the user's gaze is a front direction if a result of the comparing is less than a predetermined threshold value, and identify that the direction of the user's gaze is not the front direction if the result of the comparing is equal to or greater than the predetermined threshold value.

3. The display apparatus as claimed in claim 1, wherein, the processor is further configured to:
compare a distance between central points of the pupil and the glint area and with respect to a distance between two identified eyes of the user, identify that the direction of the user's gaze is a front direction if a result of the comparing is less than a predetermined threshold value, and identify that the direction of the user's gaze is not the front direction if the result of the comparing is equal to or greater than the predetermined threshold value.

4. The display apparatus as claimed in claim 1, further comprising a storage configured to store an image of an eye directed in a front direction,
wherein the processor is further configured to:
identify, from the captured image, an image of an eye area of the user and compare the identified image and the image stored in the storage to identify the direction of the user's gaze, if at least one of the pupil, and the glint area is not identified from the captured image.

5. The display apparatus as claimed in claim 1, further comprising a storage configured to store an image of an eye directed in a front direction,
wherein the processor is further configured to:
identify, from the captured image, an image of the user's eye area, compare the identified image and the image stored in the storage to identify the direction of the user's gaze, and identify the direction of the user's gaze if the direction of the user's gaze identified based on a location relation between the pupil, and the glint area is the same as the direction of the user's gaze identified using the image stored in the storage.

6. The display apparatus as claimed in claim 1, wherein the camera is further configured to obtain the captured image via a preview, and
wherein the processor is further configured to:
identify the direction of the user's gaze based on the captured image obtained via the preview, and control the camera to acquire a still image based on the identified direction of the user's gaze.

7. The display apparatus as claimed in claim 6, wherein the processor is further configured to:
identify an iris of the user from the captured image, compare a distance between central points of the pupil and the glint area with respect to a size of the iris, identify that the direction of the user's gaze is a front direction if a result of the comparing is less than a predetermined threshold value, and control the camera to acquire the still image in response to identifying that the direction of the user's gaze is the front direction.

8. The display apparatus as claimed in claim 6, wherein the processor is further configured to:
compare the distance between central points of the pupil and the glint area with respect to a distance between two identified eyes of the user, and identify that the direction of the user's gaze is a front direction if a result of the comparing is less than a predetermined threshold value, and control the camera to acquire the still image in response to identifying that the direction of the user's gaze is the front direction.

9. A method of controlling a display apparatus, the method comprising:
outputting a light toward a user;
identifying, from an image of the user captured, a pupil of the user, an iris of the user and a glint area obtained by a reflection of the light; and
identifying, a direction of the user's gaze based on a distance between the pupil and the glint area, and a size of the iris.

10. The method as claimed in claim 9, further comprising:
identifying an iris of the user from the captured image, comparing a distance between central points of the pupil and the glint area with respect to a size of the iris, identifying that the direction of the user's gaze is a front direction if a result of the comparing is less than a predetermined threshold value, and identifying that the direction of the user's gaze is not the front direction if the result is equal to or greater than the predetermined threshold value.

11. The method as claimed in claim 9, further comprising:
comparing a distance between central points of the pupil and the glint area with respect to a distance between two identified eyes of the user, identifying that the direction of the user's gaze is a front direction if a result of the comparing is less than a predetermined threshold value, and identifying that the direction of the user's gaze is not the front direction if the result of the comparing is equal to or greater than the predetermined threshold value.

12. The method as claimed in claim 9, further comprising:
identifying, from the captured image, an image of an eye area of the user and comparing the identified image and an eye image stored in a storage to identify the direction of the user's gaze, if at least one of the pupil, the iris, and the glint area is not identified from the captured image.

13. The method as claimed in claim 9, further comprising:
identifying, from the captured image, an image of an eye area of the user and comparing the identified image and an eye image stored in a storage to identify the direction of the user's gaze, and identifying the direction of the user's gaze if the direction of the user's gaze identified based on a relation between a location of the pupil and the glint area, and a size of the iris, is the same as the direction of the user's gaze identified using the eye image stored in the storage.

14. The method as claimed in claim 9, further comprising:
generating the captured image via a preview, and identifying the direction of the user's gaze based on the captured image obtained via the preview to acquire a still image.

15. The method as claimed in claim 14, wherein the acquiring the still image comprises:
comparing a distance between central points between the pupil and the glint area with respect to a size of the iris, and acquiring the still image if identifying that the direction of the user's gaze is a front direction based on a result of the comparing is less than a predetermined threshold value.

16. The method as claimed in claim 14, wherein the acquiring the still image comprises:

comparing the distance between central points of the pupil and the glint area with respect to a distance between two identified eyes of the user, and acquiring the still image if identifying that the user's gaze direction is a front direction based on a result of the comparing is less than a predetermined threshold value.

* * * * *